US008699757B2

(12) United States Patent
Yang et al.

(10) Patent No.: US 8,699,757 B2
(45) Date of Patent: *Apr. 15, 2014

(54) SOFTWARE EMBODIED ON A NON-TRANSITORY STORAGE MEDIA FOR DISTANCE MEASUREMENT USING SPECKLE PATTERN

(71) Applicant: PixArt Imaging Inc., Hsinchu (TW)

(72) Inventors: Shu-Sian Yang, Hsinchu (TW); Hsin-Chia Chen, Hsinchu (TW); Ren-Hau Gu, Hsinchu (TW); Sen-Huang Huang, Hsinchu (TW)

(73) Assignee: PixArt Imaging Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/967,430

(22) Filed: Aug. 15, 2013

(65) Prior Publication Data

US 2013/0329963 A1    Dec. 12, 2013

Related U.S. Application Data

(63) Continuation of application No. 13/225,830, filed on Sep. 6, 2011, now Pat. No. 8,538,085.

(30) Foreign Application Priority Data

Sep. 6, 2010  (TW) ............................... 99130084 A

(51) Int. Cl.
    *G06K 9/00*    (2006.01)
(52) U.S. Cl.
    USPC ....................................................... 382/106
(58) Field of Classification Search
    None
    See application file for complete search history.

(56) References Cited

U.S. PATENT DOCUMENTS

| 5,493,362 A | 2/1996 | Nonaka |
| 2007/0216894 A1 | 9/2007 | Garcia et al. |

FOREIGN PATENT DOCUMENTS

| CN | 1735789 A | 2/2006 |
| CN | 101206380 A | 6/2008 |
| CN | 101806895 A | 8/2010 |
| JP | 240505 A | 2/1990 |
| TW | 201031895 A | 9/2010 |

OTHER PUBLICATIONS

Long, et al, "Accuracy analysis and configuration design of stereo photogrammetry system based on CCD", Feb. 2008, vol. 29 No. 2, Chinese Journal of Scientific Instrument.

*Primary Examiner* — Nirav G Patel
(74) *Attorney, Agent, or Firm* — WPAT, PC; Justin King

(57) ABSTRACT

A storage media provided by the present invention, has a non-transitory processing software for computing a position of an object in a distance measurement system, the execution of the processing software comprising: receiving a plurality of reference image information contained in an image with a speckle pattern, wherein the image is projected from a light beam on a plurality of reference flat surfaces which are located on different position points, and the speckle contains a plurality of speckles; receiving an object image information contained in an image with the speckle pattern which is projected from the light beam on an object; obtaining a plurality of comparison results through comparing the plurality of reference image information with the object image information; and computing the position of the object through performing an interpolation operation to the plurality of comparison results.

4 Claims, 10 Drawing Sheets

SOFTWARE EMBODIED ON A NON-TRANSITORY STORAGE MEDIA FOR DISTANCE MEASUREMENT USING SPECKLE PATTERN

CROSS-REFERENCE TO RELATED APPLICATION

This application is a continuation application of U.S. patent application Ser. No. 13/225,830, filed on Sep. 6, 2011, which claims the priority benefit of Taiwan application serial no. 099130084, filed on Sep. 6, 2010. The entirety of the above-mentioned patent applications are incorporated herein by reference and made a part of this specification.

FIELD OF THE INVENTION

The present invention relates to a distance measurement technology, and more particularly to a 3D (three-dimensional) distance measurement technology.

BACKGROUND OF THE INVENTION

Basically, the distance measurement equipments in present can be categorized to two types, one is the contact distance measurement equipment and the other is the contactless distance measurement equipment. The contact distance measurement equipment, such as the coordinate measurement machine (CMM) which is often realized by the traditional distance measurement method, has an advantage of having a higher accuracy; however, the object may be damaged by the contact distance measurement equipment while the object is physically contacted to the contact distance measurement equipment. Therefore, it is not proper to adopt the contact distance measurement equipment to measure the position of a high-value object.

Compared to the contact distance measurement equipment, the contactless distance measurement equipment has a much higher operation frequency which is over millions per second, so as the contactless distance measurement equipment has a wider application field. The contactless distance measurement equipments can be further categorized to two types, one is the active-and-contactless distance measurement equipment and the other is the passive-and-contactless distance measurement equipment. In the active-and-contactless distance measurement equipment, a power wave is first projected to an object, and the position of the object is then determined through computing the distance between the object and a reference position; wherein the power wave can be a visible light, a high energy light beam, an ultrasonic wave, or a X-ray.

SUMMARY OF THE INVENTION

The present invention provides a storage media having a non-transitory processing software applied to a distance measurement system for precisely computing a position of an object.

A storage media provided by one embodiment of the present invention, has a non-transitory processing software for computing a position of an object in a distance measurement system. The execution of the processing software comprising: receiving a plurality of reference image information contained in an image with a speckle pattern, wherein the image is projected from a light beam on a plurality of reference flat surfaces which are located on different position points, and the speckle contains a plurality of speckles; receiving an object image information contained in an image with the speckle pattern which is projected from the light beam on an object; obtaining a plurality of comparison results through comparing the plurality of reference image information with the object image information; and computing the position of the object through performing an interpolation operation to the plurality of comparison results. The step of obtaining a plurality of comparison results through comparing the plurality of reference image information with the object image information comprises: obtaining a plurality of similarity scores through comparing the plurality of reference image information with the object image information, and defining the plurality of similarity scores as the plurality of comparison results. The step of computing the position of the object through performing an interpolation operation to the plurality of comparison results comprises: selecting at least two similarity scores with highest values from the plurality of similarity scores; and computing the position of the object through performing the interpolation operation to a ratio of these at least two similarity scores with highest values.

From another viewpoint, a storage media provided by another embodiment of the present invention, has a non-transitory processing software for computing a position of an object in a distance measurement system. The execution of the processing software comprising: receiving a plurality of reference image information contained in an image with a speckle pattern, wherein the image is projected from a light beam on a plurality of reference flat surfaces which are located on different position points, and the speckle contains a plurality of speckles; receiving an object image information contained in an image with the speckle pattern which is projected from the light beam on an object; obtaining a plurality of comparison results through comparing the plurality of reference image information with the object image information; and computing the position of the object through performing an interpolation operation to the plurality of comparison results. The step of obtaining a plurality of comparison results through comparing the plurality of reference image information with the object image information comprises: obtaining a plurality of variation vectors of each of the plurality of speckles through comparing the positions of each of the plurality of speckles on each of the plurality of reference flat surfaces located at different position points; and obtaining a plurality of estimating positions through comparing the plurality of reference image information with the object image information based on the plurality of variation vectors of each of the plurality of speckles, and defining the plurality of estimating positions as the plurality of comparison results.

From other viewpoint, a storage media provided by other embodiment of the present invention, has a non-transitory processing software for computing a position of an object in a distance measurement system. The execution of the processing software comprising: receiving a plurality of reference image information contained in an image with a speckle pattern, wherein the image is projected from a light beam on a plurality of reference flat surfaces which are located on different position points, and the speckle contains a plurality of speckles; receiving an object image information contained in an image with the speckle pattern which is projected from the light beam on an object; obtaining a plurality of comparison results through comparing the plurality of reference image information with the object image information; and computing the position of the object through performing an interpolation operation to the plurality of comparison results. The execution of the processing software further comprising: eliminating an effect of environment brightness through performing a normalizing operation to each of the plurality of speckles; computing the positions of each of the plurality of speckles in the plurality of reference image information according to the brightness of each of the plurality of speckles on each of the plurality of reference flat surfaces; and obtaining the plurality of comparison results through comparing the position of each of the plurality of speckles in the object image information with the positions of each of the plurality of speckles in each of the plurality of reference image information.

From other viewpoint, a storage media provided by other embodiment of the present invention, has a non-transitory processing software for computing a position of an object in a distance measurement system. The execution of the processing software comprising: receiving a plurality of reference image information contained in an image with a speckle pattern, wherein the image is projected from a light beam on a plurality of reference flat surfaces which are located on different position points, and the speckle contains a plurality of speckles; receiving an object image information contained in an image with the speckle pattern which is projected from the light beam on an object; obtaining a plurality of comparison results through comparing the plurality of reference image information with the object image information; and computing the position of the object through performing an interpolation operation to the plurality of comparison results. The execution of the processing software further comprising: building a brightness information of each of the plurality of speckles through comparing the brightness of each of the plurality of speckles to the brightness of a plurality of surrounding speckles; computing the positions of each of the plurality of speckles in the plurality of reference image information according to the plurality of brightness information; and obtaining the plurality of comparison results through comparing the position of each of the plurality of speckles in the object image information with the positions of each of the plurality of speckles in the plurality of reference image information.

Because the distance measurement in the present invention is done through projecting an image with a speckle pattern to an object and multiple reference flat surfaces, the 3D contactless distance measurement is realized. Also, the distance measurement in the present invention is done through obtaining multiple comparison results by comparing an object image information with multiple reference image information, and then performing an interpolation operation to the multiple comparison results, so as a more accurate position of the object is obtained.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
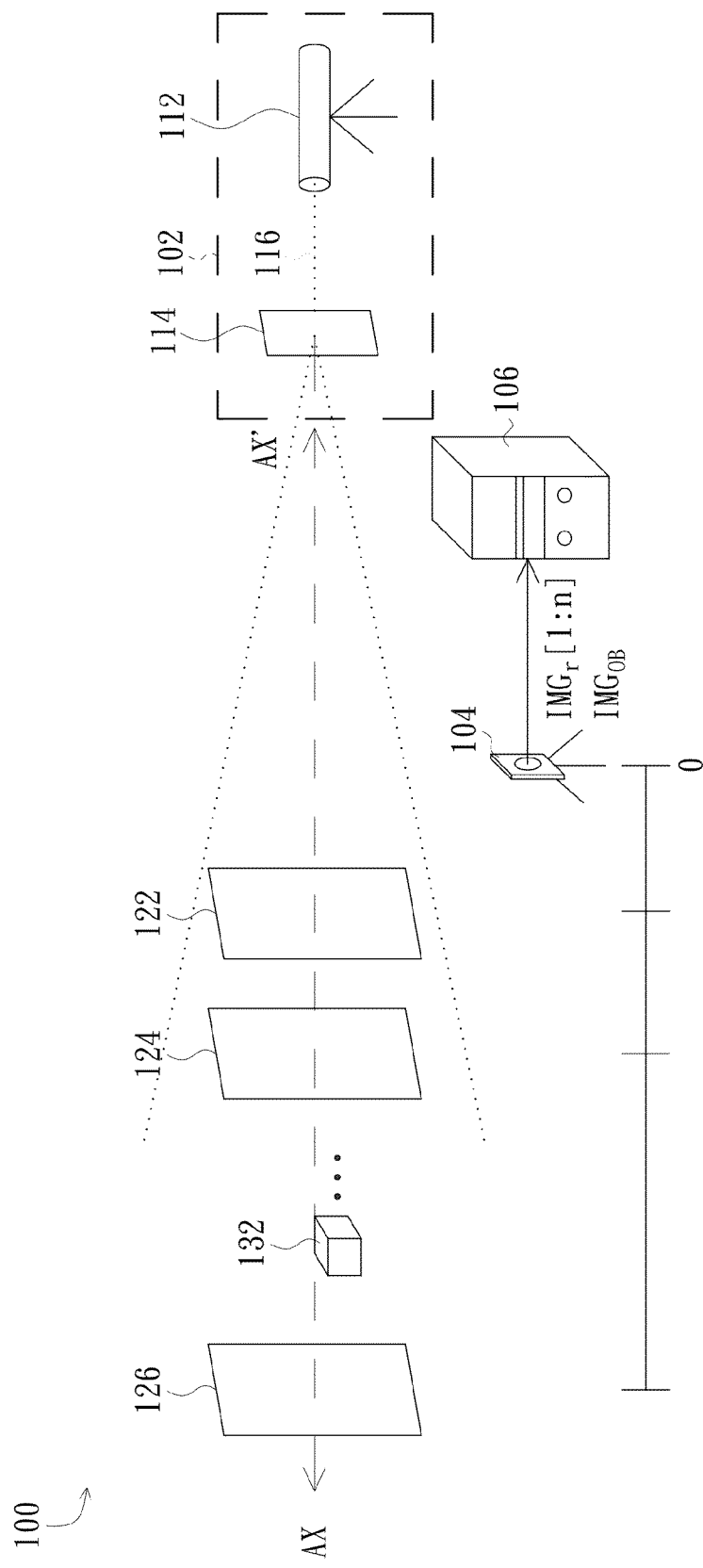
FIG. 1 is a schematic structural diagram of a distance measurement system of the first embodiment of the present invention.
Figure 2A:
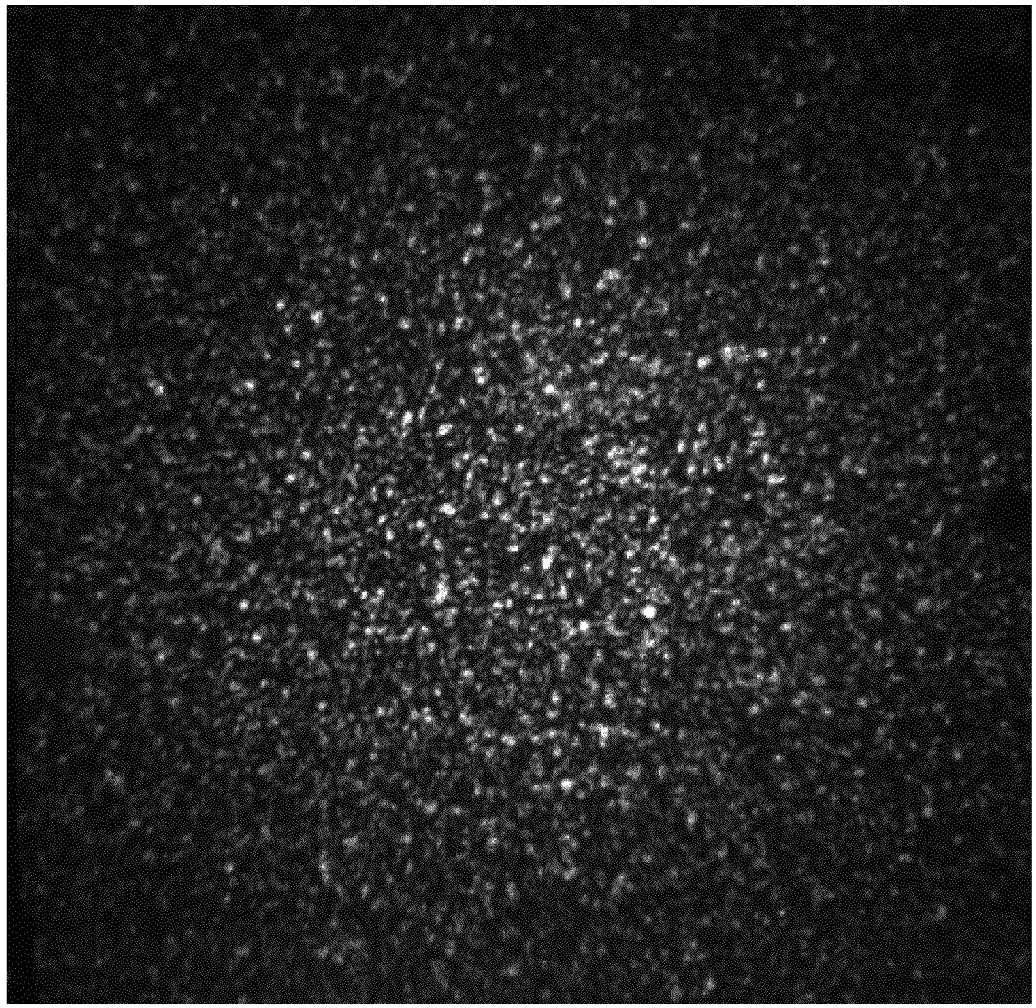
FIGS. 2A to 2D are pictures of an image with the speckle pattern projected on four reference flat surfaces which are individually located at four different position points.
Figure 2B:
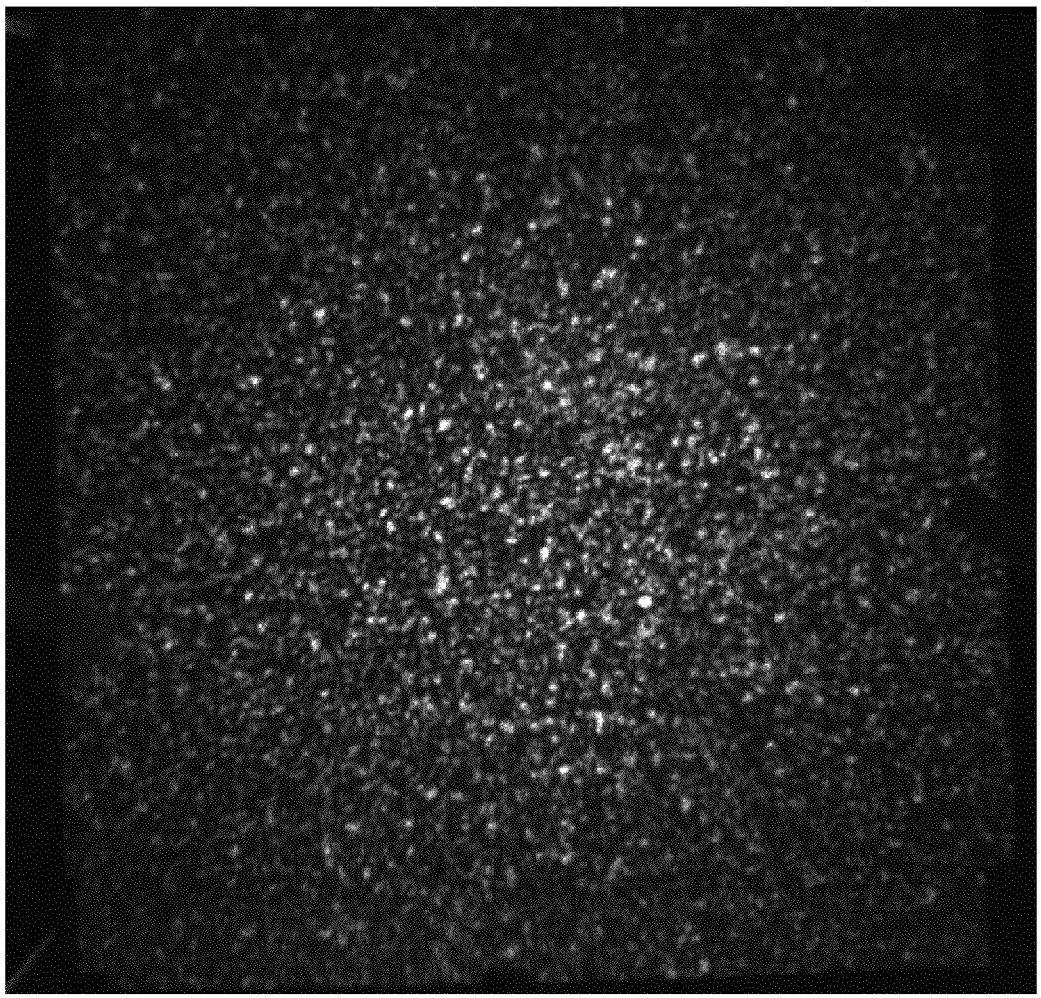
Figure 2C:
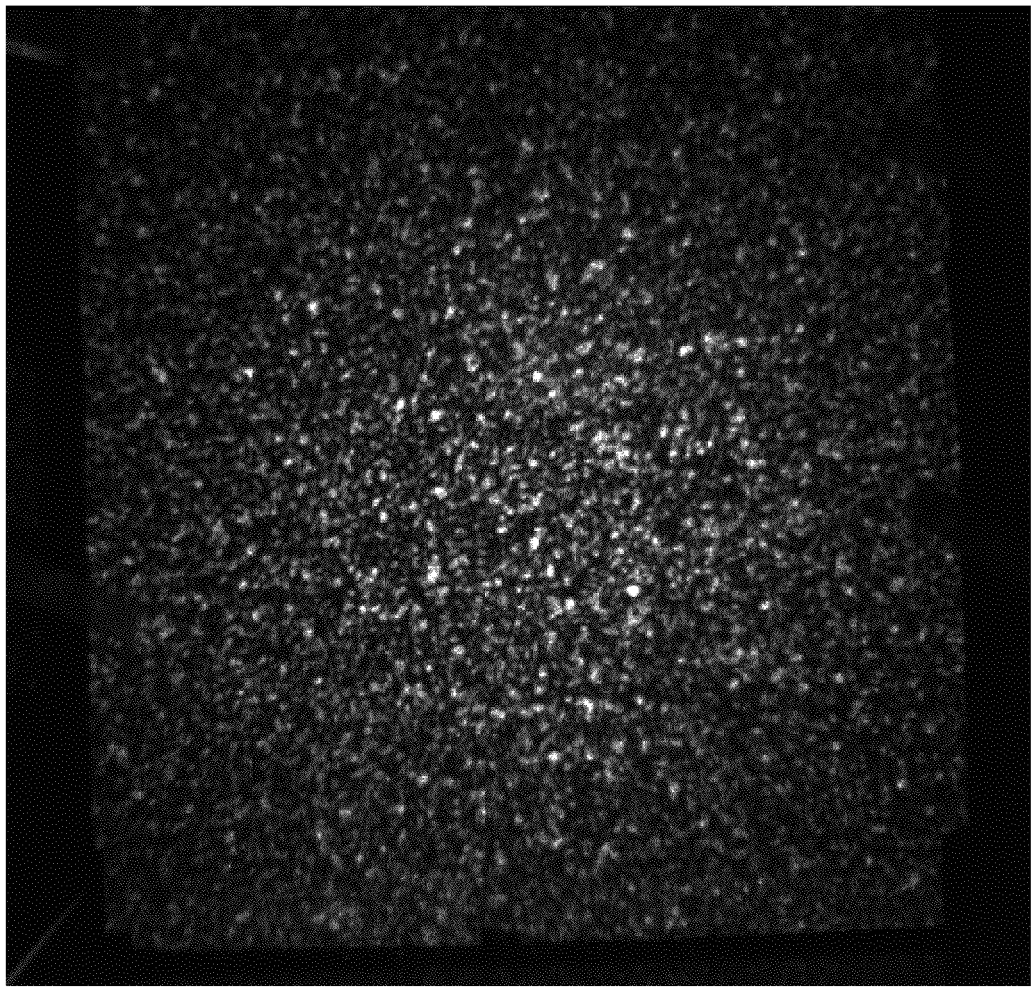
Figure 2D:
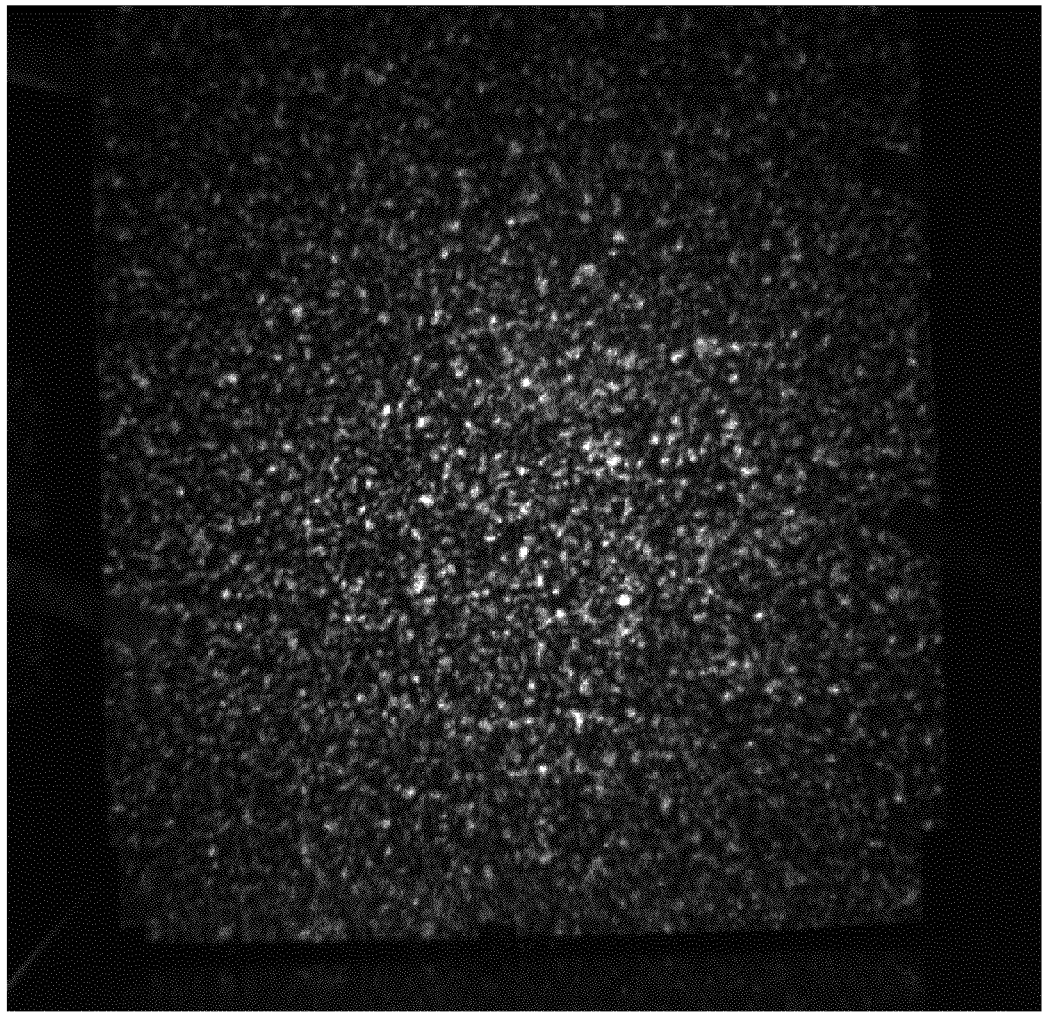

FIG. 1 is a schematic structural diagram of a distance measurement system of a first embodiment of the present invention. The distance measurement system 100 of the first embodiment mainly includes a light source module 102, an image capture device 104, and a processing module 106, wherein light source module 102 is capable of projecting a light beam containing an image with a speckle pattern within a detecting range, and the image capture device 104 is coupled to the processing module 106. In this embodiment, the light source module 106 could be a planar light source module but not be limited thereto.

As depicted in FIG. 1, the light source module 102 could includes a laser light source 112 and a diffusion device 114; wherein the laser light source 112 can be a gas laser (such as a He—Ne laser) or a semiconductor laser, and the diffusion device 114 can be a diffuser, a frosted glass, or other diffraction devices. In this embodiment of the present invention, when a laser beam 116 emitted from the laser light source 112 is transmitted to the diffusion component 114, diffraction and interference phenomenon may occur in the diffuse component 114 so that the light source module 102 could be the planar light source providing the light beam having the speckle pattern.

In the embodiment of the present invention, the image with the speckle pattern which is emitted from the light source module 102 is projected to one or more reference flat surfaces. As depicted in FIG. 1, the image with the speckle pattern is projected to three reference flat surfaces 122, 124, and 126; wherein the three reference flat surfaces 122, 124, and 126 are individually located at three different position points. Within a visible range, these reference flat surfaces are parallel to each other in some embodiments, or the distance between each two successive reference flat surfaces is same in some other embodiments; however, it is understood that the first embodiment of the present invention is not limited to the above-mentioned restrictions. As depicted in FIG. 1, the reference flat surfaces 122, 124, and 126 are vertical to the laser beam 116; in other words, the reference flat surfaces 122, 124, and 126 are vertical to a optical axis AX-AX' of the light beam which is emitted from the light source module 102.

As mentioned above, the image of the speckle pattern is shown on the surface of each of the multiple reference flat surfaces while the light beam is projected from the light source module 102 to the multiple reference flat surfaces. FIGS. 2A to 2D are pictures of the images with the speckle pattern projected on four reference flat surfaces which are individually located at four different position points, wherein the distances from a reference position to the four reference flat surfaces are respectively 70 cm, 75 cm, 80 cm, and 85 cm.

As depicted in FIG. 2, each image shown on the four reference flat surfaces contains multiple speckles, as mentioned above.

As depicted in FIG. 1, after these images of the speckle pattern are shown on the reference flat surfaces 122, 124, and 126, these images are then captured by the image capture device 104 and accordingly multiple reference image information $IMG_r[1:n]$ are generated by the image capture device 104 based on the captured images shown on the reference flat surfaces 122, 124, and 126; wherein n is an integer and greater than 1, and the image capture device 104 can be a camera or other charge-coupled devices (CCD) and is arranged at a reference position 0 which is located by the side of the optical axis AX-AX'. The multiple reference image information $IMG_r[1:n]$ are then transmitted to the processing module 106 from the image capture device 104; wherein the processing module 106, for computing the position of an object 132 through processing the multiple reference image information $IMG_r[1:n]$, can be a computer system or a processing software. More detail descriptions of the processing module 106 to compute the position of the object 132 are given later.

As depicted in FIGS. 2A to 2D, each individual speckle is located at a different location on each of the multiple reference flat surfaces. To determine the position of each speckle on each of the multiple reference flat surfaces, the embodiment of the present invention adopts the brightness of the speckle as a measurement reference. A speckle has a higher brightness if the speckle is closer to the optical axis AX-AX' and a speckle has a lower brightness if the speckle is far away to the optical axis AX-AX'. Therefore, the position of each individual speckle on each of the multiple reference flat surfaces can be determined by measuring the brightness of each individual speckle on each of the multiple reference flat surfaces.

In addition, the environment light may affect the brightness of the multiple speckles on the reference flat surfaces, thus the processing module 106 in some embodiments would perform a normalizing process to each of the multiple speckles for eliminating the effect of the environment light to the brightness of the speckles. In some other embodiments, the elimination of the effect of the environment light is done through replacing the brightness of the speckle by a brightness information which is built by comparing the brightness of a specific speckle to the brightness of multiple surrounding speckles.

Figure 3:
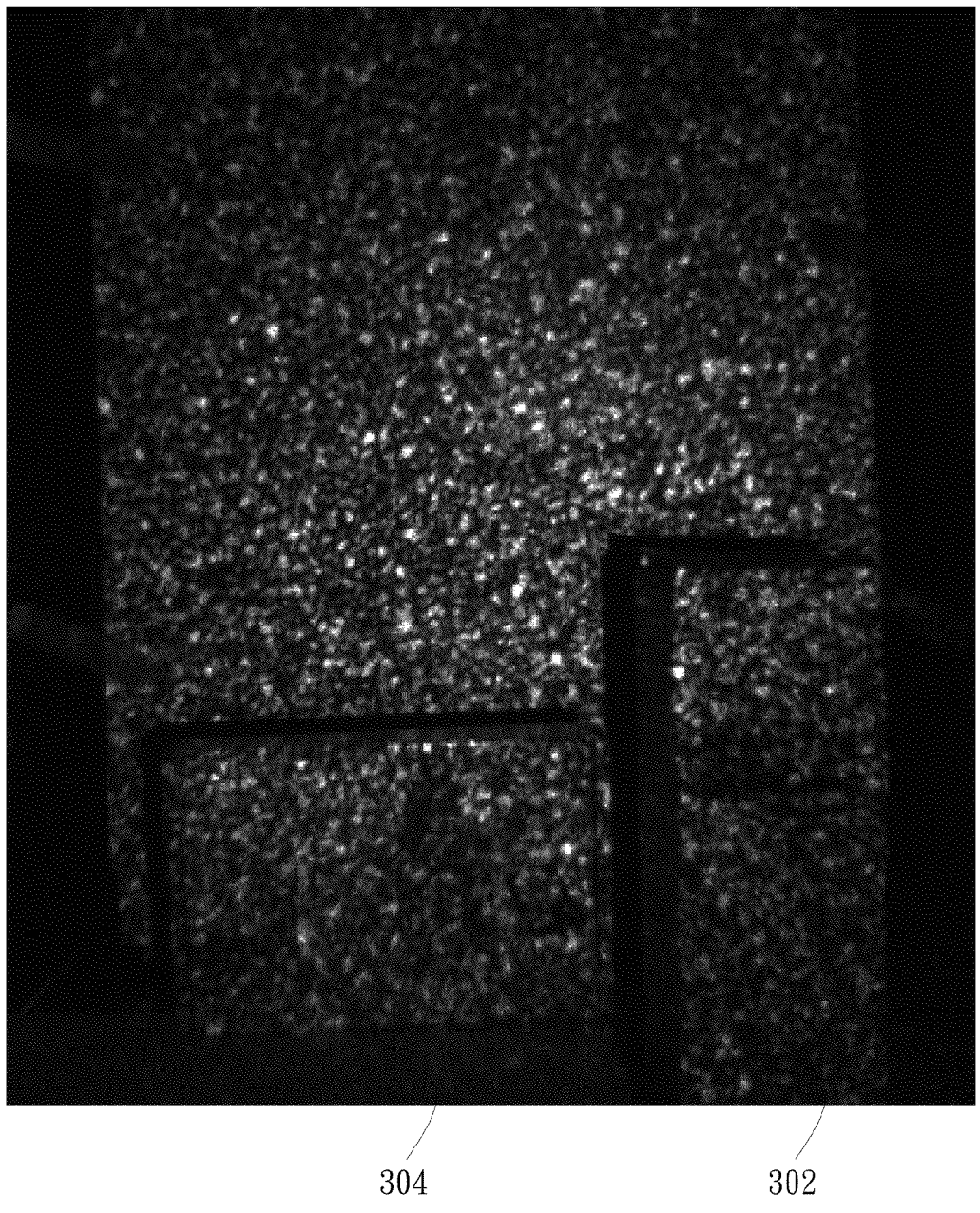
FIG. 3 is a picture of an image with the speckle pattern shown on the object in the first embodiment.

As depicted in FIG. 1, the image of the speckle pattern is also shown on the object 132 while the object 132 is located at the optical axis AX-AX' and within the detecting range, accordingly an object image information $IMG_{OB}$ is generated by the image capture device 104 and then further transmitted to the processing module 106 after the image shown on the object 132 is captured by the image capture device 104. FIG. 3 is a picture of the image with the speckle pattern shown on the object 132; wherein the images in zones 302 and 304 are partial of the image shown on the object 132.

After both the object image information $IMG_{OB}$ and the multiple reference image information $IMG_r[1:n]$ are transmitted to the processing module 106, the object image information $IMG_{OB}$ is compared to the multiple reference image information $IMG_r[1:n]$ by the processing module 106, so as multiple similarity scores are generated, wherein the multiple similarity scores are also defined as multiple comparison results. M number of the multiple similarity scores with highest values, for computing the position of the object 132, are selected by the processing module 106; wherein M is an integer and greater than 1. In the embodiment of the present invention, the processing module 106 selects three similarity scores with highest values as three candidate values, and then performs an interpolation operation to a ratio of these three candidate values. The equation of the interpolation operation performed to these three candidate values is expressed as:

$$P = p1 + (p2 - p1)\frac{\text{Max}[x, y, z]}{x + y + z} \quad (1)$$

wherein P stands for a distance between the object 132 to the reference position 0; p1 and p2 stand for the minimum distance and the maximum distance out of three reference flat surfaces corresponding to the three candidate values to the reference position 0, respectively; x, y, and z stand for three ratio values of an ratio of the three candidate values.

To get a better understanding of the embodiment of the present invention, following is an example for the operation of the distance measurement system 100. If the processing module 106 determines that the three reference flat surfaces with highest similarity have a distance of 75 cm, 80 cm, and 85 cm to the reference position 0; wherein the reference image information of these three reference flat surfaces are $IMG_r[k-1]$, $IMG_r[k]$, $IMG_r[k+1]$, and the object image information is $IMG_{OB}$, then p1=75 and p2=85. Moreover, if a ratio of the three candidate values corresponding to the three reference image information $IMG_r[k-1]$, $IMG_r[k]$, and $IMG_r[k+1]$ is 2:8:5, then x=2, y=8, z=5.

Therefore, the distance p, between the object 132 and the reference position 0, is 80.33 according to the equation (1); in other words, the distance between the object 132 and the reference position 0 is 80.33 cm.

It is understood that the above equation (1) of performing the interpolation operation to multiple candidate values is given by way of example, and not limitation. Other forms of equations, such as firstly performing a square operation or a log operation to candidate values x, y, z and then performing the interpolation operation can be adopted in other embodiments.

In some other embodiments, multiple variation vectors of each of the speckle are introduced for computing the position of the object 132. As depicted in FIG. 1, multiple variation vectors are obtained based on the variation of the locations of each of the speckle on the multiple reference flat surfaces while the reference image information $IMG_r[1:n]$ is transmitted to the processing module 106. For example, the variation vector of a specific speckle can be obtained through the processing module 106 measuring the difference between the locations of the specific speckle on two successive reference flat surfaces. Because the variation of each speckle obtained from two successive reference flat surfaces may be non-liner, accordingly the variation vector of each speckle obtained from two successive reference flat surfaces may be non-liner.

After the variation vector of each of the multiple speckles is obtained, an estimating position of the object is determined by the processing module 106 through comparing the object image information with one of the multiple reference image information based on the variation vector. It is understood that multiple estimating positions of a speckle are obtained in the processing module 106 if the speckle has multiple variation vectors. After a one or more estimating positions are obtained, the processing module 106 then performs the interpolation operation to the one or more estimating positions so as the position of the object 132 is determined. Because only one of the multiple reference image information $IMG_r[1:n]$ is necessary in the embodiment after the variation vector of each of the speckle is obtained, the storage space for storing the reference image information $IMG_r[1:n]$ in the processing module 106 is relatively small so as less complicate in the operation of the processing module 106.

Figure 4:
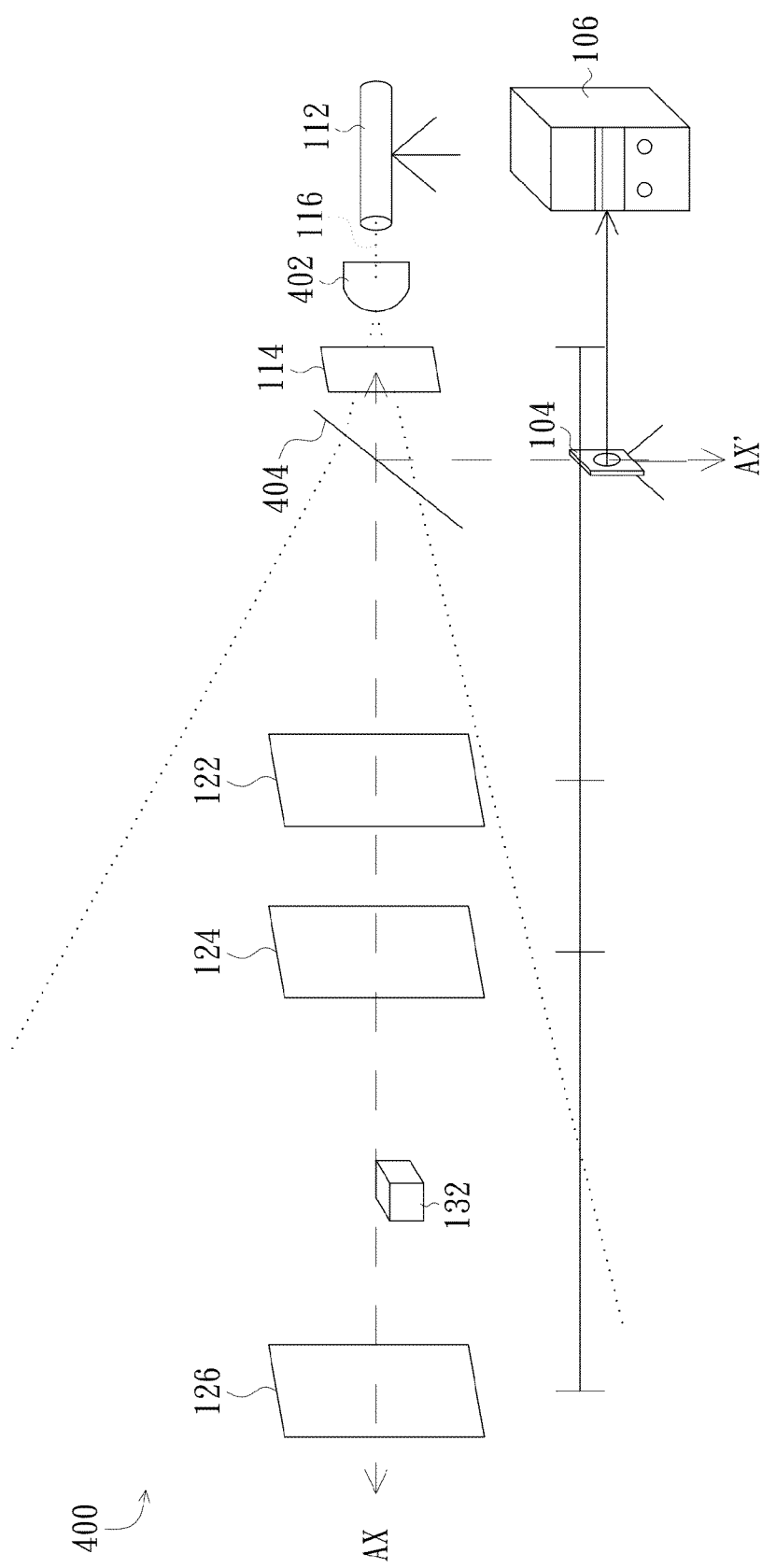
FIG. 4 is a schematic structural diagram of a distance measurement system of the second embodiment of the present invention.

FIG. 4 is a schematic structural diagram of a distance measurement system of a second embodiment of the present invention. Compared to the location of the image capture device 104 which is arranged by the side of the optical axis AX-AX' and is arranged between the laser light source 112 and the reference flat surface 122 as depicted in FIG. 1 of the distance measurement system 100 of the first embodiment, the lens (not shown) of the image capture device 104, in the distance measurement system 400 of the second embodiment as depicted in FIG. 4, is arranged on the path of the optical axis AX-AX'. Moreover, a lens 402 is arranged between the laser light source 112 and the diffusion device 114, so as the laser beam 116 is emitted to the diffusion device 114 from the laser light source 112 via the lens 402. Moreover, an interference splitter 404 is arranged between the diffusion device 114 and the reference flat surface 122, so as the images projected on the reference flat surfaces 122, 124, 126, and the object 132 can be reflected to the image capture device 104 via the optical axis AX-AX' by the interference splitter 404.

Figure 5:
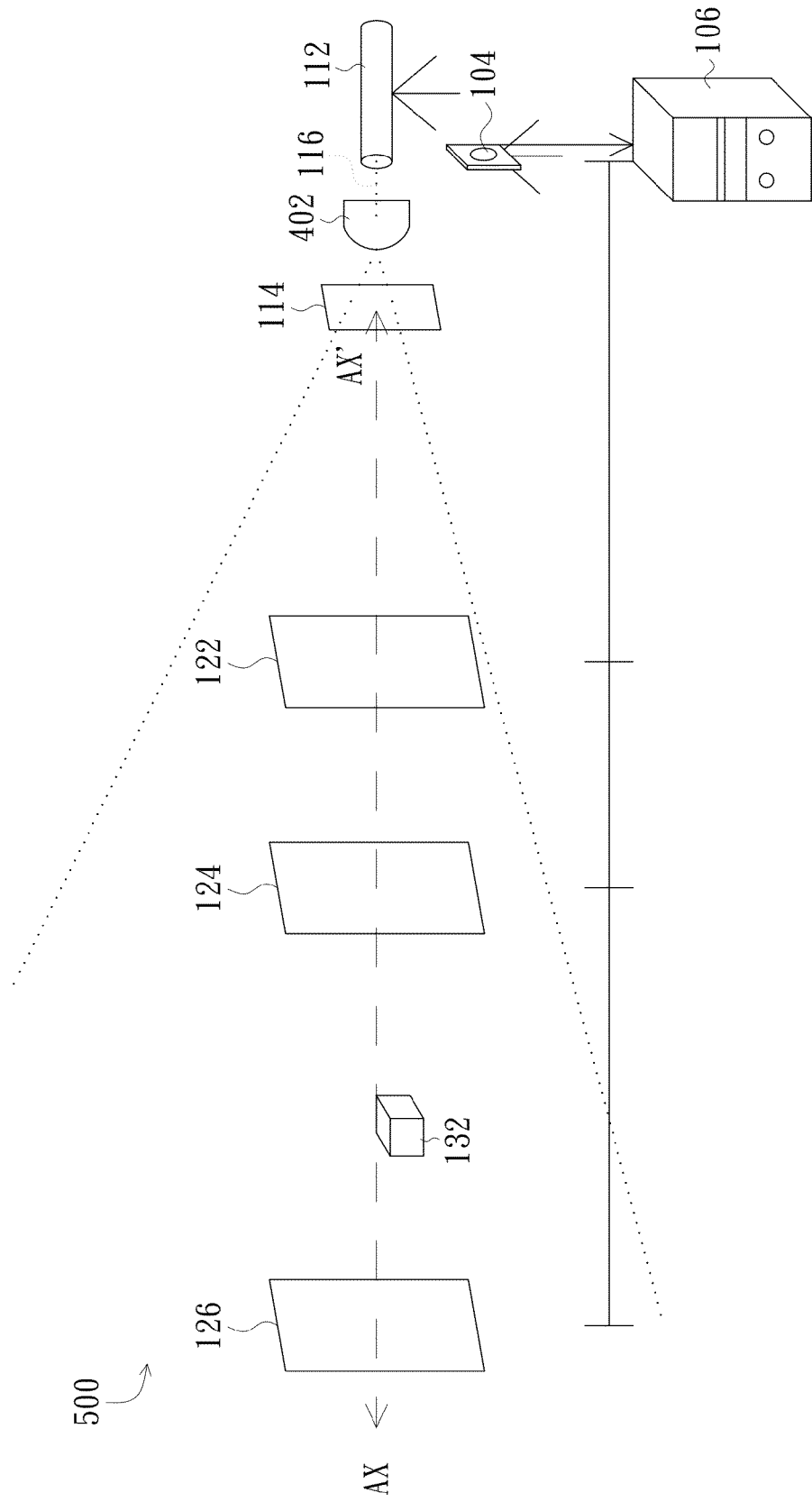
FIG. 5 is a schematic structural diagram of a distance measurement system of the third embodiment of the present invention.

FIG. 5 is a diagram of a distance measurement system of a third embodiment of the present invention. As depicted in the distance measurement system 500 of the third embodiment, the image capture device 104 is arranged at a specific position corresponding to the laser light source 112. Because the arrangements and the functions of the rest devices in the distance measurement system 500 have been described in the distance measurement system 100 of the first embodiment and the distance measurement system 400 of the second embodiment, no any unnecessary detail is given here.

Figure 6:
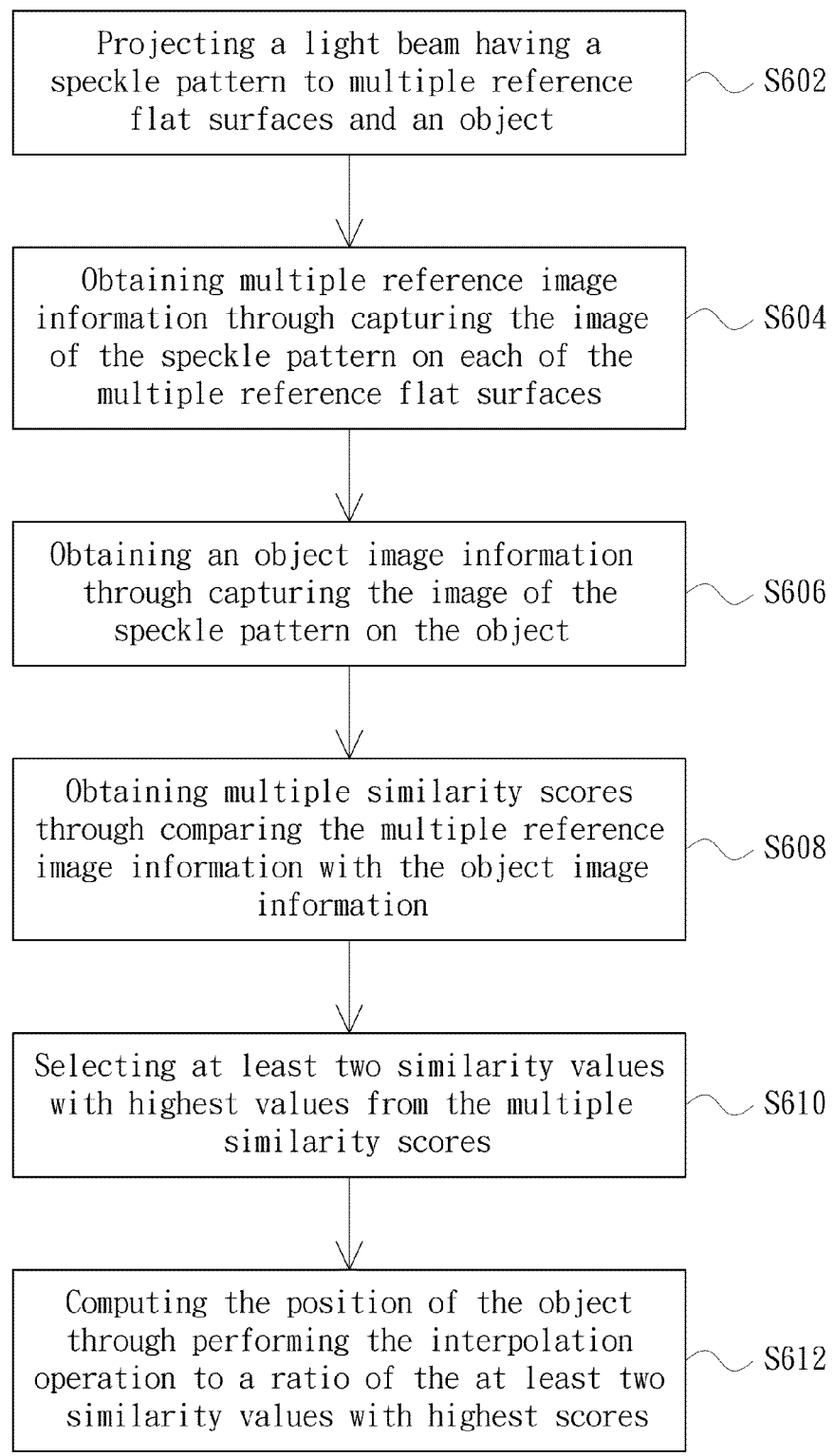
FIG. 6 is a flow chart of a distance measurement method of the first embodiment of the present invention.

FIG. 6 is a flow chart of a distance measurement method of a first embodiment of the present invention. In some embodiments, the distance measurement method can be implemented by a processing software. In these embodiments, the processing software can be saved in a storage media, such as an USB device, an optical storage media, a HDD, an external HDD. Referring FIG. 6, firstly, projecting a light beam with a speckle pattern to multiple reference flat surfaces and an object which are located at different position points so as to show an image of the speckle patterns on each of the multiple reference flat surfaces and the object; wherein the speckle pattern contains multiple speckles (step S602). Afterwards, obtaining multiple reference image information through capturing the image of the speckle pattern on each of the multiple reference flat surfaces (step S604). Afterwards, obtaining an object image information through capturing the image of the speckle pattern on the object (step S606). Afterwards, obtaining multiple similarity scores through comparing the multiple reference image information with the object image information (step S608). Afterwards, selecting at least two similarity scores with highest values from the multiple similarity scores (step S610). Afterwards, computing the position of the object through performing the interpolation operation to a ratio of the at least two similarity scores with highest values (step S612).

Figure 7:
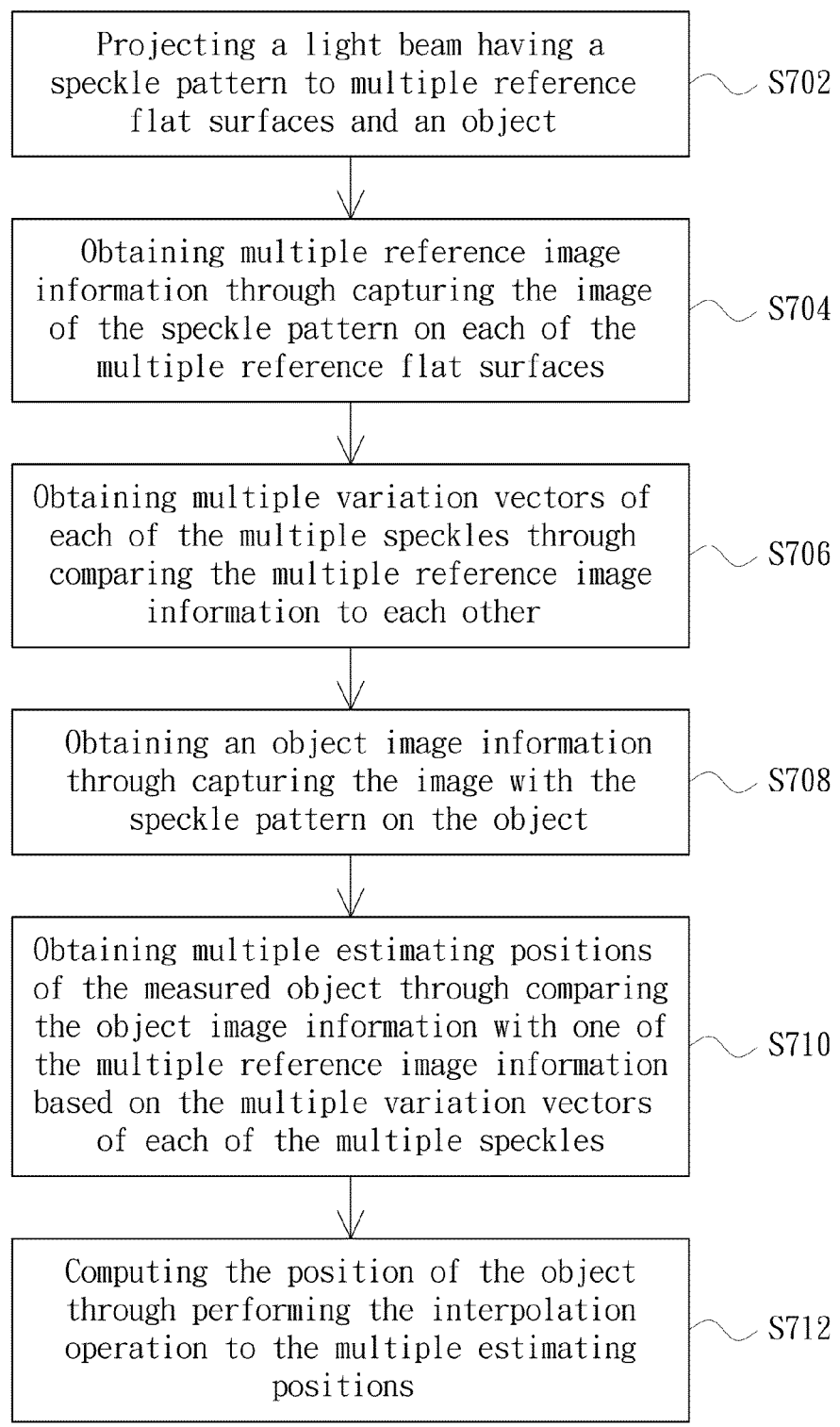
FIG. 7 is a flow chart of a distance measurement method of the second embodiment of the present invention.

FIG. 7 is a flow chart of a distance measurement method of a second embodiment of the present invention. Similarly, the distance measurement method in this embodiment also can be implemented by the processing software and saved in the storage media. As depicted in FIG. 7, the steps S702 and S704 in the distance measurement method of the second embodiment are respectively same as the steps S602 and S604 in the distance measurement method of the first embodiment as depicted in FIG. 6, so as no any unnecessary detail is given here. Firstly, obtaining multiple variation vectors of each of the multiple speckles through comparing the multiple reference image information to each other (step S706) after obtaining the multiple reference image information (step S704). Afterwards, obtaining an object image information through capturing the image with the speckle pattern on the object (step S708). Afterwards, obtaining multiple estimating positions of the object through comparing the object image information with one of the multiple reference image information based on the multiple variation vectors of each of the multiple speckles (step S710). Afterwards, computing the position of the object through performing the interpolation operation to the multiple estimating positions (step S712).

To sum up, a more accurate position of an object is determined in the present invention through firstly comparing the object image information with multiple reference image information, and then performing the interpolation operation to the multiple comparison results.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A non-transitory storage media, has a non-transitory processing software for computing a position of an object in a distance measurement system, the execution of the processing software comprising:

receiving a plurality of reference image information contained in an image with a speckle pattern, wherein the image is projected from a light beam on a plurality of reference flat surfaces which are located on different position points, and the speckle contains a plurality of speckles;

receiving an object image information contained in an image with the speckle pattern which is projected from the light beam on an object;

obtaining a plurality of comparison results through comparing the plurality of reference image information with the object image information; and computing the position of the object through performing an interpolation operation to the plurality of comparison results;

wherein the step of obtaining a plurality of comparison results through comparing the plurality of reference image information with the object image information comprises:

obtaining a plurality of similarity scores through comparing the plurality of reference image information with the object image information, and defining the plurality of similarity scores as the plurality of comparison results;

wherein the step of computing the position of the object through performing an interpolation operation to the plurality of comparison results comprises:

selecting at least two similarity scores with highest values from the plurality of similarity scores; and computing the position of the object through performing the interpolation operation to a ratio of these at least two similarity scores with highest values.

2. A non-transitory storage media, has a non-transitory processing software for computing a position of an object in a distance measurement system, the execution of the processing software comprising:

receiving a plurality of reference image information contained in an image with a speckle pattern, wherein the image is projected from a light beam on a plurality of reference flat surfaces which are located on different position points, and the speckle contains a plurality of speckles;

receiving an object image information contained in an image with the speckle pattern which is projected from the light beam on an object;

obtaining a plurality of comparison results through comparing the plurality of reference image information with the object image information; and computing the position of the object through performing an interpolation operation to the plurality of comparison results;

wherein the step of obtaining a plurality of comparison results through comparing the plurality of reference image information with the object image information comprises:

obtaining a plurality of variation vectors of each of the plurality of speckles through comparing the positions of each of the plurality of speckles on each of the plurality of reference flat surfaces located at different position points; and obtaining a plurality of estimating positions through comparing the plurality of reference image information with the object image information based on the plurality of variation vectors of each of the plurality of speckles, and defining the plurality of estimating positions as the plurality of comparison results.

3. A non-transitory storage media, has a non-transitory processing software for computing a position of an object in a distance measurement system, the execution of the processing software comprising:

receiving a plurality of reference image information contained in an image with a speckle pattern, wherein the image is projected from a light beam on a plurality of reference flat surfaces which are located on different position points, and the speckle contains a plurality of speckles;

receiving an object image information contained in an image with the speckle pattern which is projected from the light beam on an object;

obtaining a plurality of comparison results through comparing the plurality of reference image information with the object image information; and computing the position of the object through performing an interpolation operation to the plurality of comparison results;

wherein the execution of the processing software further comprising:

eliminating an effect of environment brightness through performing a normalizing operation to each of the plurality of speckles;

computing the positions of each of the plurality of speckles in the plurality of reference image information according to the brightness of each of the plurality of speckles on each of the plurality of reference flat surfaces; and obtaining the plurality of comparison results through comparing the position of each of the plurality of speckles in the object image information with the positions of each of the plurality of speckles in each of the plurality of reference image information.

4. A non-transitory storage media, has a non-transitory processing software for computing a position of an object in a distance measurement system, the execution of the processing software comprising:

receiving a plurality of reference image information contained in an image with a speckle pattern, wherein the image is projected from a light beam on a plurality of reference flat surfaces which are located on different position points, and the speckle contains a plurality of speckles;

receiving an object image information contained in an image with the speckle pattern which is projected from the light beam on an object;

obtaining a plurality of comparison results through comparing the plurality of reference image information with the object image information; and computing the position of the object through performing an interpolation operation to the plurality of comparison results;

wherein the execution of the processing software further comprising:

building a brightness information of each of the plurality of speckles through comparing the brightness of each of the plurality of speckles to the brightness of a plurality of surrounding speckles;

computing the positions of each of the plurality of speckles in the plurality of reference image information according to the plurality of brightness information; and obtaining the plurality of comparison results through comparing the position of each of the plurality of speckles in the object image information with the positions of each of the plurality of speckles in the plurality of reference image information.

* * * * *